United States Patent [19]

Miyashita

[11] Patent Number: 5,342,813
[45] Date of Patent: Aug. 30, 1994

[54] CATALYST FOR POLYMERIZING AROMATIC VINYL COMPOUND AND PROCESS FOR PRODUCING POLYMER OF AROMATIC VINYL COMPOUND

[75] Inventor: Akira Miyashita, Saitama, Japan

[73] Assignee: Tosoh Corporation, Shinnanyo, Japan

[21] Appl. No.: 960,705

[22] Filed: Oct. 14, 1992

[30] Foreign Application Priority Data

Oct. 14, 1991 [JP] Japan .................. 3-291978

[51] Int. Cl.$^5$ ..................... C08F 4/64; B01J 31/00
[52] U.S. Cl. ..................... 502/117; 502/103; 585/512; 526/153; 526/160
[58] Field of Search ..................... 502/103, 117

[56] References Cited

U.S. PATENT DOCUMENTS

| | | | |
|---|---|---|---|
| 4,404,344 | 9/1983 | Sinn et al. | 502/117 X |
| 4,658,078 | 4/1987 | Slaugh et al. | 502/117 X |
| 4,701,432 | 10/1987 | Welborn | 502/103 X |
| 4,794,096 | 12/1988 | Ewen | 502/117 |
| 5,086,135 | 2/1992 | Kissin | 502/117 X |

*Primary Examiner*—Asok Pal
*Attorney, Agent, or Firm*—Oblon, Spivak, McClelland, Maier & Neustadt

[57] ABSTRACT

A catalyst for polymerizing an aromatic vinyl compound is provided which is composed of a catalyst component (A) and a catalyst component (B); the catalyst component (A) being a reaction product derived by reacting an organic transition metal compound having a substituted or unsubstituted cyclopentadienyl group, with an alkylaluminum compound, and represented by the general formula (I):

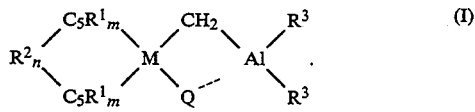

where $C_5R^1_m$ is a substituted or unsubstituted cyclopentadienyl group: R is hydrogen or a hydrocarbon group having 1 to 20 carbons, each $R_1$ being independent; $R^2$ is an alkylene group having 1 to 4 carbons, a dialkylsilicon group, a dialkylgermanium group, an alkylphoshine group, or an alkylamine group, the alkylene or alkyl group, and $R^2$ crosslinks the two ($C_5R^1_m$) rings; m is an integer of 0 to 5; n is 0 or 1; when n=0, m=5, Q is an alkyl group or a halogen atom; $R^3$ is a hydrocarbon group having 1 to 18 carbons; and M is a metal of Group IVB of Periodic Table; and the catalyst component (B) being an aluminoxane represented by the general formula (II) or (III):

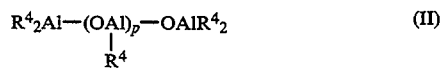

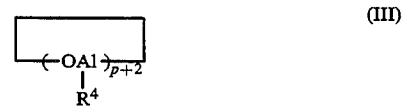

where p is an integer of 4 to 30, and $R^4$ is a hydrocarbon group. A process for producing a polymer of an aromatic vinyl compound is also provided which comprises polymerizing the aromatic vinyl compound in the presence of the catalyst specified above.

9 Claims, No Drawings

CATALYST FOR POLYMERIZING AROMATIC VINYL COMPOUND AND PROCESS FOR PRODUCING POLYMER OF AROMATIC VINYL COMPOUND

BACKGROUND OF THE INVENTION

1. Field of the Invention

The present invention relates to a catalyst for polymerizing an aromatic vinyl compound, and a process for producing a polymer of the aromatic vinyl compound. More particularly, the present invention relates to a catalyst and a process for producing a polymer of an aromatic vinyl compound mainly in a syndiotactic configuration with high catalytic activity.

2. Description of the Related Art

Aromatic vinyl polymers are classified into three types according to the steric configuration: namely, syndiotactic polymers, isotactic polymers, and atactic polymers. Of these three types of polymers, the syndiotactic polymers are useful as heat-resistant polymers because of their higher melting points and higher crystallization rates in comparison with other types of polymers. The syndiotactic aromatic vinyl polymers are produced, for example, by employing a catalyst composed of a titanium compound such as a titanium halide and alkoxytitanium and a reaction product of an organoaluminum compound with a condensing agent such as a aluminoxane as disclosed in Japanese Patent Application Laid-Open No. Sho 62-104818.

In polymerization of styrene, however, the catalysts prepared by combination of a titanium compound such as titanium tetrahalide and tetraethoxytitanium with methylalumoxane have low activity, and consequently the catalyst remains in a large amount in the produced polymer, which causes presumably discoloration by heat of the polymer remarkably in heat molding, rendering the polymer unsuitable for practical uses.

On the other hand, in the polymerization of styrene with a catalysts, which is prepared by combining methylalumoxane with a complex prepared by reacting a transition metal compound such as titanium tetrachloride with a diphenyl sulfide type of organic compound, although the catalyst has high polymerization activity, the ratio of stereoregular polymer is rather low in the resulting whole polymer mainly because of formation of an atactic polymer as a by-product. If the content of the atactic polymer is high, post-treatment such as solvent extraction is disadvantageoulsy required in order to avoid the adverse effects of the atactic polymer on melting point and crystallization velocity.

After comprehensive studies by the present inventors to offset the above disadvantage, it has been found that a syndiotactic aromatic vinyl polymer having a high degree of syndiotacticity can be produced with high catalyst activity by use of a specific catalyst system composed of an organic transition metal compound derived by reacting a transition metal compound with an alkylaluminum, and an organic aluminum compound. Consequently the present invention has been completed on the basis of this discovery.

SUMMARY OF THE INVENTION

The present invention intends to provide a catalyst and a process for polymerizing an aromatic vinyl compound into a polymer predominantly of a syndiotactic configuration with a high degree of selectivity.

The catalyst for polymerizing aromatic vinyl compound according to the present invention is composed of a catalyst component (A) and a catalyst component (B), the catalyst component (A) being a reaction product derived by reacting an organic transition metal compound having a substituted or unsubstituted cyclopentadienyl group, with an alkylaluminum compound, and represented by the general formula (I):

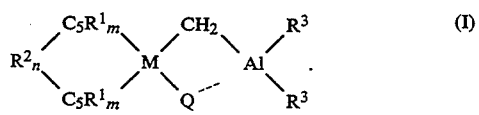

where $C_5R^1_m$ is a substituted or unsubstituted cyclopentadienyl group; $R^1$ is hydrogen or a hydrocarbon group having 1 to 20 carbons, each $R_1$ being independent; $R^2$ is an alkylene group having 1 to 4 carbons, a dialkylsilicon group, a dialkylgermanium group, an alkylphoshine group, or an alkylamine group, the alkylene or alkyl group, and $R^2$ crosslinks the two $(C_5R^1_m)$ rings; m is an integer of 0 to 5; n is 0 or 1; when n=0, m=5, Q is an alkyl group or a halogen atom; $R^3$ is a hydrocarbon group having 1 to 18 carbons; and M is a metal of Group IVB of Periodic Table; and the catalyst component (B) being an aluminoxane represented by the general formula

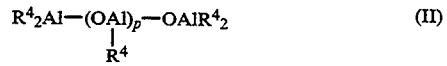

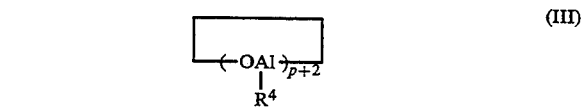

where p is an integer of 4 to 30, and $R^4$ is a hydrocarbon group.

The process for producing the aromatic vinyl polymer according to the present invention uses the above catalyst and gives a stereoregular aromatic vinyl compound polymer having a high syndiotacticity with a high catalyst activity.

DETAILED DESCRIPTION OF THE PREFERRED EMBODIMENT

The catalyst component (A) of the catalyst of the aromatic vinyl compound polymerization of the present invention is synthesized by use of the transition metal compound represented by the general formula (IV):

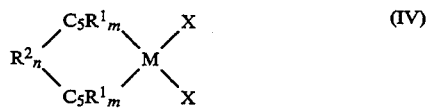

where $C_5R^1_m$ is a substituted or unsubstituted cyclopentadienyl group; $R^1$ is hydrogen or a hydrocarbon group having 1 to 20 carbons, each $R_1$ being independent; $R^2$ is an alkylene group having 1 to 4 carbons, a dialkylsilicon group, a dialkylgermanium group, an alkylphosphine group, or an alkylamine group, the alkylene or alkyl group, and $R^2$ crosslinks the two $C_5R^1_m$ rings; m is an integer of 0 to 5; M is a metal of Group IVB of Periodic Table including titanium, zirconium, and hafnium, titanium being preferred; and X is an alkyl group or a halogen atom, chlorine being preferred.

As is known in the art, "$C_5R^1_m$" defines a cyclopentadienyl group. The cyclopentadienyl groups of the compound represented by the general formula (IV) above are preferably bound to M in the manner shown by the general formula (IV-A):

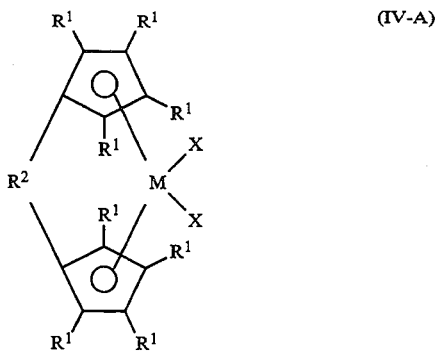

In formula (VI-A) above, n as described above for formula (IV) is 1. Thus, when n is 1 in formula (IV), the number of $R^1$ groups bound to each of the $C_5$ rings as shown in Formula (IV-A) above indicates that m is preferably 4.

However, when n is 0, the cyclopentadienyl rings are preferably bound to M in the manner shown in the general formula (IV-B):

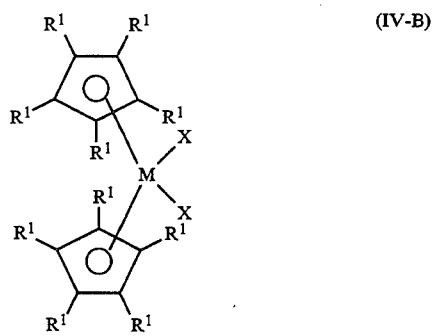

Thus, as shown in formula (IV-B) above, when n is 0, m is preferably 5.

The compounds of the general formula (IV) have been disclosed by Kaminsky (*Angew. Chem.*, 1985, vol. 97, p. 507) and Ewen (*J. Am. Chem. Soc.*, 1988, vol. 110, p. 6256).

Specific examples of the transition metal compound include: bis(cyclopentadienyl)titanium dichloride, methylene-bis(cyclopentadienyl)titanium dichloride, dimethylsilyl-bis(cyclopentadienyl)titanium dichloride, isopropyl-bis(cyclopentadienyl)titanium dichloride, bis(cyclopentadienyl)zirconium dichloride, methylene-bis(cyclopentadienyl)zirconium dichloride, dimethylsilyl-bis(cyclopentadienyl)zirconium dichloride, isopropyl-bis(cyclopentadienyl)zirconium dichloride, bis(cyclopentadienyl)hafnium dichloride, methylene-bis(cyclopentadienyl)hafnium dichloride, dimethylsilyl-bis(-cyclopentadienyl)hafnium dichloride, isopropyl-bis(cyclopentadienyl)hafnium dichloride, and the like.

The other component required for the synthesis of the catalyst component (A) of the catalyst for aromatic vinyl compound polymerization is a trialkylaluminum. A compound represented by the general formula $AlR^5_3$, is useful as the trialkylaluminum where $R^5$ is an alkyl group having 1 to 12 carbons. Specifically the trialkylaluminum includes trimethylaluminum, triethylaluminum, triisopropylaluminum, tri-n-propylaluminum, triisobutylaluminum, tri-n-butylaluminum, and the like.

The compounds of formulae (II) and (III) have been disclosed by Sinn et al (*Adv. Organomet. Chem.*, 1980, vol. 18, p. 99).

In the synthesis of the component (A) of the catalyst for the aromatic vinyl compound polymerization, the ratio of the transition metal compound to the trialkylaluminum is in a range of from 1 to 10 in terms of molar ratio. The two components are reacted under the aforementioned reaction conditions, and the reaction product can be isolated without impurity by separation (and purification) from the excess alkylaluminum by recrystallization or a like method. In the obtained complex, the molar ratio of aluminum to the transition metal is 1:1, which is confirmed by determining the amount of methane evolved by decomposition of the complex. The obtained complex has a structure of $M-CH_2-Al$, which is confirmed by determination of isobutene formed by the reaction of the complex with acetone. Further, the structure of formula (I) of the complex is confirmed by $^1NMR$ measurement.

The component (B) of the catalyst for aromatic vinyl compound polymerization is an aluminoxane represented by the general formula (II) or (III). The compounds represented by the general formulae (II) and (III) can be present in the catalyst mixture simultaneously, and in any molar ratio desired. The substituent of the aluminoxane is an alkyl group having 1 to 6 carbons such as methyl, ethyl, propyl, butyl, etc. Among them, methyl is preferred. The oligomerization degree is in a range of from 4 to 60. Such compounds can be prepared by any known method. In one example of the method, aluminum compound is added to a suspension of a crystal-water-containing salt (e.g., copper sulfate hydrate, aluminum sulfate hydrate, etc.) in a hydrocarbon solvent to cause reaction.

The ratio of the catalyst component (B) to the catalyst component (A), [(B)/(A)], is in a range of from 10 to 1000. With this catalyst system, a polymer having sufficiently high stereoregularity is obtained even at the Al/M ratio of 300 or lower, or 100 or lower.

The aromatic vinyl compounds to be polymerized according the present invention are styrene and derivatives thereof. The styrene derivatives include alkylstyrenes such as methylstyrene, ethylstyrene, and dimethylstyrene; halogenated styrenes such as chlorostyrene, bromostyrene, and fluorostyrene; halogen-substituted alkylstyrenes such as chloromethylstyrene; alkoxystyrenes such as methoxystyrene; catboxymethylstyrene, alkyl ether styrene, (alkoxy alkylstyrene), alkylsilylstyrenes, and the like.

In the present invention, an aromatic vinyl compound is polymerized in the presence of the above-mentioned catalyst. The polymerization may be conducted in bulk; or in a medium in an aliphatic hydrocarbon such as pentane, hexane, and heptane; an alicyclic hydrocarbon such as cyclohexane; or an aromatic hydrocarbon such as benzene, toluene, and xylene.

The concentration of the catalyst component (A) is in a range of from 0.1 to 1000 mmol/l. The polymerization temperature is not limited, but is preferably in a range of from $-78°$ to $150°$ C.

The present invention is described in more detail by reference to Examples without limiting the invention in any way.

EXAMPLE 1

Synthesis of (μ-chloro) (μ-methylene)methylene-bis(cyclopentadienyl) (dimethylaluminum)titanium In a nitrogen-purged Schlenk type reaction vessel, 150 mg (0.57 mmol) of methylene-bis(cyclopentadienyl)titanium dichloride was weighed out. Thereto 30 ml of dried toluene was added, and the mixture was cooled to −20° C. Thereto 2.3 mmol of trimethylaluminum was added dropwise slowly with stirring. The reaction solution was gradually warmed to room temperature, and then stirred continuously for 12 hours. The reaction solution changed gradually its color from reddish violet to reddish brown. The reaction solution was stirred further at 60° C. for 2 hours, and then restored to room temperature. Thereby the reaction solution turned dark brown. Hexane was added thereto, and the formed precipitate was collected by filtration, dried, and recrystallized. The yield of the complex was 62%.

The methane evolved by hydrolysis of the resulting complex was determined by gas chromatography. The quantity of the methane corresponded to 96% of the calculated quantity for the structure of the complex of the general formula (I). Separately, the resulting complex was reacted with acetone in toluene. The quantity of the formed isobutene corresponded to 93% of the calculated quantity for the structure of the complex of the general formula (I). The identification of the structure of the resulting complex by $^1$H—NMR was as below:

0.05 ppm (s, Al-Me)
3.51 ppm (s, $C_5H_4$—$CH_2$—$C_5H_4$)
4.76 ppm (t, $C_5H_4$)
5.21 ppm (t, $C_5H_4$)
8.05 ppm (s, Ti—$CH_2$—Al)

EXAMPLE 2

In a nitrogen-purged Schlenk type reactor, 12 mg (0.041 mmol) of the complex synthesized in Example 1 was weighed out, and thereto 10 ml of toluene was added. Further thereto, 6.0 ml of styrene was added, and a solution of 0.51 mmol of methylalumoxane (16-mer) in toluene was added dropwise thereto. The reaction was allowed to proceed at 30° C. for one hour. Thereafter, 100 ml of methanol-hydrochloric acid solution was added to stop the reaction. The formed white polymer was collected by filtration, and dried. The yield of the dried polymer was 2.96 g.

This polymer was extracted with methyl ethyl ketone by means of a Soxhlet extractor. As the result, no methyl ethyl ketone-soluble portion was found.

The molecular weight of the resulting polymer was 65,000 in weight average by gel permeation chromatography (GPC). The melting point thereof was 267° C. by differential scanning calorimetry (DSC). The structure of the polymer was analyzed by $^{13}$C—NMR in o-dichlorobenzene, and the pentad rrrr was calculated to be not less than 99% on the basis of the peak of 145.5 ppm originating from the syndiotactic configuration.

COMPARATIVE EXAMPLE 1

Polymerization was conducted in the same manner as in Example 2 except that 0.041 mmol of methylene-bis(cyclopentadienyl)titanium dichloride was used as the metallocene catalyst component. Consequently, the yield of the dried polymer was 0.9 g. The polymer contained a methyl ethyl ketone-soluble portion at a content of 8% by Soxhlet extraction.

EXAMPLE 3

Synthesis of (μ-chloro) (μ-methylene)dimethylsilyl-bis(cyclopentadienyl) (dimethylaluminum)titanium In a nitrogen-purged Schlenk type reaction vessel, 150 mg (0.49 mmol) of dimethylsilyl-bis(cyclopentadienyl)titanium dichloride was weighed out. Thereto 20 ml of dried toluene was added, and the mixture was cooled to −40° C. Thereto 2.1 mmol of trimethylaluminum was added dropwise slowly with stirring. The reaction solution was gradually warmed to room temperature, and then stirred continuously for 10 hours. The reaction solution changed gradually its color from reddish brown to brackish brown. The reaction solution was stirred further at 60° C. for 1 hours, and then restored to room temperature. Thereby the reaction solution turned dark brown. Hexane was added thereto, and the formed precipitate was collected by filtration, dried, and recrystallized. The yield of the complex was 78%.

The methane evolved by hydrolysis of the resulting complex was determined by gas chromatography. The quantity of the methane corresponded to 92% of the calculated quantity for the structure of the complex of the general formula (I). Separately, the resulting complex was reacted with acetone in toluene. The quantity of the formed isobutene corresponded to 96% of the calculated quantity for the structure of the complex of the general formula (I). The identification of the structure of the resulting complex by $^1$H—NMR was as below:

−0.02 ppm (s, Al-Me)
0.72 ppm (s, Si-Me)
6.32 ppm (t, $C_5H_4$)
7.97 ppm (t, $C_5H_4$)
8.22 ppm (s, Ti—$CH_2$—Al)

EXAMPLE 4

In a nitrogen-purged Schlenk type reactor, 14 mg (0.041 mmol) of the complex synthesized in Example 3 was weighted out, and thereto 10 ml of toluene was added. Further thereto, 6.0 ml of styrene was added, and a solution of 0.51 mmol of methylalumoxane (16-mer) in toluene was added dropwise thereto. The reaction was allowed to proceed at 30° C. for one hour. Thereafter, 100 ml of methanol-hydrochloric acid solution was added to stop the reaction. The formed white polymer was collected by filtration, and dried. The yield of the dried polymer was 1.8 g.

This polymer was extracted with methyl ethyl ketone by means of a Soxhlet extractor. As the result, no methyl ethyl ketone-soluble portion was found.

The molecular weight of the resulting polymer was 67,000 in weight average by gel permeation chromatography (GPC). The melting point thereof was 263° C. by differential scanning calorimetry (DSC). The structure of the polymer was analyzed by $^{13}$C—NMR in o-dichlorobenzene, and the pentad rrrr was calculated to be not less than 99% on the basis of the peak of 145.5 ppm originating from the syndiotactic configuration.

COMPARATIVE EXAMPLE 2

Polymerization was conducted in the same manner as in Example 4 except that 0.041 mmol of dimethylsilyl-bis(cyclopentadienyl)titanium dichloride was used as the metallocene catalyst component. Consequently, the yield of the dried polymer was 0.6 g. The polymer contained a methyl ethyl ketone-soluble portion at a content of 9% by Soxhlet extraction.

EXAMPLE 5

Synthesis of (μ-chloro)(μ-methylene)isopropylidene-bis(cyclopentadienyl)(dimethylaluminum)titanium In a nitrogen-purged Schlenk type reaction vessel, 150 mg (0.52 mmol) of isopropylidene-bis(cyclopentadienyl)titanium dichloride was weighed out. Thereto 20 ml of dried toluene was added, and the mixture was cooled to −40° C. Thereto 2.8 mmol of trimethylaluminum was added dropwise slowly with stirring. The reaction solution was gradually warmed to room temperature, and then stirred continuously for 10 hours. The reaction solution changed gradually its color from reddish brown to blackish brown. The reaction solution was stirred further at 50° C. for 1 hour, and then restored to room temperature. Thereby the reaction solution turned dark brown. Hexane was added thereto, and the formed precipitate was collected by filtration, dried, and recrystallized. The yield of the complex was 83%.

The methane evolved by hydrolysis of the resulting complex was determined by gas chromatography. The quantity of the methane corresponded to 99% of the calculated quantity for the structure of the complex of the general formula (I). Separately, the resulting complex was reacted with acetone in toluene. The quantity of the formed isobutene corresponded to 98% of the calculated quantity for the structure of the complex of the general formula (I).

EXAMPLE 6

In a nitrogen-purged Schlenk type reactor, 13 mg (0.041 mmol) of the complex synthesized in Example 5 was weighted out, and thereto 10 ml of toluene was added. Further thereto, 6.0 ml of styrene was added, and a solution of 0.51 mmol of methylalumoxane (16-mer) in toluene was added dropwise thereto. The reaction was allowed to proceed at 30° C. for one hour. Thereafter, 100 ml of methanol-hydrochloric acid solution was added to stop the reaction. The formed white polymer was collected by filtration, and dried. The yield of the dried polymer was 1.9 g.

This polymer was extracted with methyl ethyl ketone by means of a Soxhlet extractor. As the result, no methyl ethyl ketone-soluble portion was found.

The molecular weight of the resulting polymer was 15,000 in weight average by gel permeation chromatography (GPC). The melting point thereof was 262° C. by differential scanning calorimetry (DSC). The structure of the polymer was analyzed by $^{13}$C—NMR in o-dichlorobenzene, and the pentad rrrr was calculated to be not less than 99% on the basis of the peak of 145.5 ppm originating from the syndiotactic configuration.

COMPARATIVE EXAMPLE 3

Polymerization was conducted in the same manner as in Example 6 except that 0.041 mmol of isopropylidene-bis(cyclopentadienyl)titanium dichloride was used as the metallocene catalyst component. Consequently, the yield of the dried polymer was 0.8 g. The polymer contained a methyl ethyl ketone-soluble portion at a content of 8% by Soxhlet extraction.

As described above, by use of the catalyst of the present invention, stereoregular aromatic vinyl polymers can be produced efficiently with high catalyst activity with high syndiotacticity.

What is claimed is:

1. A catalyst for polymerizing aromatic vinyl compound composed of a catalyst component (A) and a catalyst component (B), the catalyst component (A) being a reaction product derived by reacting an organic transition metal compound having a substituted or unsubstituted cyclopentadienyl group, with an alkylaluminum compound, and represented by the general formula (I):

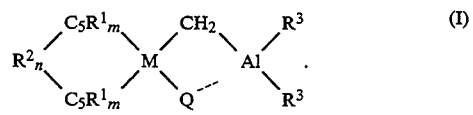

where $C_5R^1{}_m$ is a substituted or unsubstituted cyclopentadienyl group; $R^1$ is hydrogen or a hydrocarbon group having 1 to 20 carbons, each $R_1$ being independent; $R^2$ is an alkylene group having 1 to 4 carbons, a dialkylsilicon group, a dialkylgermanium group, an alkylphosphine group, or an alkylamine group, the alkylene or alkyl group, and $R^2$ crosslinks the two ($C_5R^1{}_m$) rings; m is an integer of 0 to 5; n is 0 or 1; when n=0, m=5, Q is an alkyl group or a halogen atom; $R^3$ is a hydrocarbon group having 1 to 18 carbons; and M is a metal of Group IVB of Periodic Table; and the catalyst component (B) being an aluminoxane represented by the general formula (II) or (III):

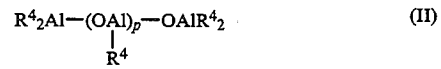

where p is an integer of 4 to 30, and $R^4$ is a hydrocarbon group.

2. The catalyst of claim 1, wherein M is titanium.
3. The catalyst of claim 1, wherein M is zirconium.
4. The catalyst of claim 1, wherein M is hafnium.
5. The catalyst of claim 1, wherein Q is chlorine.
6. The catalyst of claim 1, wherein Q is an alkyl group.
7. The catalyst of claim 1, wherein the ratio (B)/(A) is from 10–1000.
8. The catalyst of claim 1, wherein the ratio (B)/(A) is from 10 to 300.
9. The catalyst of claim 1, wherein the ratio (B)/(A) is from 10 to 100.

* * * * *